(12) United States Patent
Mizutani et al.

(10) Patent No.: US 7,132,014 B2
(45) Date of Patent: *Nov. 7, 2006

(54) OIL-BASED PIGMENTED INK COMPOSITION

(75) Inventors: Takuo Mizutani, Kyoto (JP); Takahiro Furutani, Suita (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/058,200

(22) Filed: Feb. 16, 2005

(65) Prior Publication Data

US 2005/0148689 A1    Jul. 7, 2005

Related U.S. Application Data

(62) Division of application No. 10/864,592, filed on Jun. 10, 2004, now Pat. No. 7,014,698.

(30) Foreign Application Priority Data

Jun. 12, 2003    (JP)    ............................ P2003-167331

(51) Int. Cl.
     *C09D 11/02* (2006.01)
(52) U.S. Cl. ............................ 106/31.86; 106/31.76; 106/31.65; 106/31.72
(58) Field of Classification Search ............. 106/31.86, 106/31.76, 31.65, 31.72
    See application file for complete search history.

(56) References Cited

U.S. PATENT DOCUMENTS

| 5,314,531 A | 5/1994 | Huber et al. |
| 5,376,169 A | 12/1994 | Hotomi et al. |
| 5,980,624 A | 11/1999 | Ichikawa |
| 6,231,654 B1 | 5/2001 | Elwakil |
| 6,379,444 B1 | 4/2002 | Adkins et al. |
| 6,444,019 B1 | 9/2002 | Zou et al. |
| 6,444,020 B1 | 9/2002 | Seto et al. |
| 2002/0139280 A1 | 10/2002 | Ichikawa |

FOREIGN PATENT DOCUMENTS

| EP | 0649888 A2 | | 4/1995 |
| JP | 5-295310 A | | 11/1993 |
| JP | 07150097 A | * | 6/1995 |
| JP | 10-77432 A | | 3/1998 |
| JP | 2001-98202 A | | 4/2001 |
| JP | 2002-302629 A | | 10/2002 |
| JP | 2002-363468 A | | 12/2002 |
| WO | WO2004/007626 A1 | | 1/2004 |

* cited by examiner

*Primary Examiner*—J. A. Lorengo
*Assistant Examiner*—Veronica F. Faison
(74) *Attorney, Agent, or Firm*—Birch, Stewart, Kolasch & Birch, LLP

(57) ABSTRACT

An oil-based pigmented ink composition containing a pigment, a polymer and an organic solvent, wherein the organic solvent contains a (poly)alkylene glycol derivative in an amount of 30 to 90% by weight and a nitrogen-containing heterocyclic compound in an amount of 1 to 30% by weight, each based on the whole weight of the ink composition, and the ink composition has a flash point of at least 63° C.

12 Claims, No Drawings

OIL-BASED PIGMENTED INK COMPOSITION

This application is a Divisional of application Ser. No. 10/864,592, filed on Jun. 10, 2004 now U.S. Pat. No. 7,014,698 and for which priority is claimed under 35 U.S.C. §120; and this application claims priority of Application No. P2003-167331 filed in Japan on Jun. 12, 2003 under 35 U.S.C. §119; the entire contents of all are hereby incorporated by reference.

FIELD OF THE INVENTION

The present invention relates to an oil-based pigment composition comprising a pigment, a polymer (a pigment-dispersant and/or a fixing resin), and an organic solvent, in particular, an oil-based pigment composition for ink-jet printing systems.

PRIOR ART

In an ink-jet printing system, a liquid ink is ejected from a nozzle towards a recording medium using a pressure, heat or an electric field as a driving source to print the recording medium. The ink-jet printing system can be used with a low running cost and form high quality images. Furthermore, this printing system can use various inks such as aqueous and oil-based inks. Accordingly, the ink-jet printing system has been expanding its market.

Under such circumstances, large-size ink jet printers, which can be used to print a sheet of the A-0 size with aqueous pigmented inks, have been developed, and are used to output indoor posters, CAD (computer aided drawing) drawings, or proofing for color matching in printing. The printed materials can be used outdoors with laminating them.

Furthermore, the demand for outdoor use of the ink-jet printed materials has been increased. Therefore, oil-based pigmented inks are developed, which can be printed directly on films of polyvinyl chloride (PVC) and used outdoors without lamination, and have good water resistance and weather resistance.

Since the oil-based pigmented inks comprise organic solvents as solvents, they do not cause the cockling of a paper sheet in comparison with aqueous pigmented inks, or require no lamination of a film having a receptive layer. Therefore, they can be printed on a substrate at low cost.

For example, JP-A-10-077432 discloses an oil-based pigmented ink comprising a glycol solvent having a boiling point of at least 150° C. and a specific polyester resin. However, since this ink does not contain a solvent in which polyvinyl chloride dissolves, it is not well fixed on a film of, for example, PVC.

JP-A 2002-302629 discloses an oil-based pigmented ink comprising a solvent having a boiling point of at least 200° C. and a specific resin. However, when a glycol solvent having a boiling point of at least 200° C. is used as a single solvent, the ink has low fixing properties on a PVC film. When a ketone solvent is used, the ink has problems such that it is flammable or it emits a foul odor.

Apart from those oil-based pigmented inks, as an aqueous pigmented ink comprising an aqueous solvent, JP-A 2002-363468 discloses an aqueous pigmented ink comprising N-methyl-2-pyrrolidone as a humectant. However, this aqueous ink may not be well fixed on a film of, for example, PVC.

SUMMARY OF THE INVENTION

An object of the present invention is to provide an oil-based pigmented ink, which has high safeness and low odor which are important for an oil-based pigmented ink, can be printed on an inexpensive printing medium such as a PVC film having no receptive layer, and can endure outdoor environment.

To achieve the above object, an extensive study has been made and it has been found that when a (poly)alkylene glycol derivative and a nitrogen-containing heterocyclic compound such as N-methyl-2-pyrrolidone, N-ethyl-2-pyrrolidone, etc. are used in combination as the organic solvents of an oil-based pigmented ink composition, the ink composition has high safeness and low odor, can be printed on an inexpensive printing medium such as a PVC film having no receptive layer, and can satisfactorily endure outdoor environment, and in particular, the ink composition is suitable for ink-jet printing systems.

Accordingly, the present invention provides an oil-based pigmented ink composition comprising a pigment, a polymer and an organic solvent, wherein the organic solvent contains a (poly)alkylene glycol derivative in an amount of 30 to 90% by weight and a nitrogen-containing heterocyclic compound in an amount of 1 to 30% by weight, each based on the whole weight of the ink composition, and the ink composition has a flash point of at least 63° C.

Since the oil-based pigmented ink composition of the present invention contains the (poly)alkylene glycol derivative and the nitrogen-containing heterocyclic compound such as N-methyl-2-pyrrolidone, N-ethyl-2-pyrrolidone, etc. in combination as the organic solvent, the odor, which is one of the problems of the conventional oil-based pigmented ink compositions, can be improved, the ink composition can be printed with good fixing and drying properties on a film of PVC having no receptive layer. Furthermore, the ink composition of the present invention can form a printed material having good resistance to water and alcohol. In particular, the ink composition of the present invention is suitable for ink-jet printing systems. Since the ink composition of the present invention has a flash point of at least 63° C., it can reduce the danger in transportation and handling.

DETAILED DESCRIPTION OF THE INVENTION

In the oil-based pigmented ink composition of the present invention, the organic solvents essentially contain a (poly) alkylene glycol derivative and a nitrogen-containing heterocyclic compound.

When the ink composition containing the above combination of the solvents is printed on a printing medium having no ink-receptive layer, in particular, the PVC film, the solvents partly dissolve PVC and thus the fixing of the ink on the film is enhanced. In addition, most of the nitrogen-containing heterocyclic compounds do not violate the regulation for preventing poisoning with organic solvents in the Industrial Safety and Health Law so that they are very safe, and they have low odor. Accordingly, the ink composition containing the nitrogen-containing heterocyclic compound has high safeness and low odor.

Examples of solvents in which PVC dissolves include ketones (e.g. acetone, methyl ethyl ketone, cyclohexanone, etc.), oxygen-containing heterocyclic compounds (e.g. tetrahydrofuran, etc.), nitrogen-containing heterocyclic compounds (e.g. pyrrolidone, etc.), and so on.

Among them, the ketones and tetrahydrofuran have good PVC-dissolving power. However, acetone, methyl ethyl ketone, methyl isobutyl ketone, methyl n-butyl ketone, cyclohexanone, methylcyclohexanone, tetrahydrofuran, etc. are designated in the Industrial Safety and Health Law. A material containing 5% by weight or more of one of them can be handled by a person having a special qualification, and a person who handles such a material should get a medical checkup. Therefore, the handling of those solvents is troublesome.

Among the ketones and tetrahydrofuran derivatives other than the above compounds, ketones and tetrahydrofuran derivatives having a low molecular weight may well dissolve PVC, but many of them have a low flash point so that it is highly possible that ink compositions comprising such solvents have a flash point of lower than 63° C. Furthermore, since such solvents have strong odor, the ink composition containing only a slight amount of the solvent may emit odors. Ketones and tetrahydrofuran derivatives having a high molecular weight have a high flash point and low odor. However, such solvents less dissolve PVC and thus the pigments in the ink composition may not be sufficiently fixed to the substrate.

The nitrogen-containing heterocyclic compounds are heterocyclic compounds having at least one nitrogen atom in a ring, and most of them do not violate the regulation for preventing poisoning with organic solvents in the Industrial Safety and Health Law as described above. Therefore, they are highly safe, and emit less odor. Accordingly, ink compositions comprising such heterocyclic compounds have good safeness and low odor. That is, the nitrogen-containing heterocyclic compounds have much better properties as organic solvents of the ink compositions than the oxygen-containing heterocyclic compounds such as ketones or tetrahydrofuran.

Examples of the nitrogen-containing heterocyclic compounds include 2-pyrrolidone and its derivatives, in particular, N-alkyl-2-pyrrolidone such as N-methyl-2-pyrrolidone, N-ethyl-2-pyrrolidone, N-(2-hydroxyethyl)-2-pyrrolidone, N-cyclohexyl-2-pyrrolidone, N-octyl-2-pyrrolidone, N-dodecyl-2-pyrrolidone, N-vinyl-2-pyrrolidone, etc.

Among them, N-methyl-2-pyrrolidone and N-ethyl-2-pyrrolidone are preferable, since they have low odor and good fixing properties.

The nitrogen-containing heterocyclic compound is usually contained in an amount of 1 to 30% by weight, preferably 5 to 28% by weight, more preferably 15 to 25% by weight, based on the whole weight of the ink composition. When the amount of the nitrogen-containing heterocyclic compound is less than 1% by weight, the ink composition may not sufficiently dissolve PVC. When the amount of the nitrogen-containing heterocyclic compound exceeds 30% by weight, the effect to dissolve PVC will be saturated, and the volatility of the ink composition becomes insufficient so that printed characters or images tend to drip or blur.

To qualitatively and quantitatively analyze the nitrogen-containing heterocyclic compound in the ink composition, gas chromatographic mass spectroscopy (GCMS) is advantageously used.

The (poly)alkylene glycol derivative, which is another essential component of the organic solvent according to the present invention, has a polar group (i.e., an ester group and an ether group) and a hydrophobic group (i.e., an alkyl group) in the molecule. Therefore, when the (poly)alkylene glycol derivative is used as one of the primary solvents, it is possible to formulate an ink composition which exhibits good fixing properties and water resistance not only on the PVC substrate but also any other printing medium such as a plain paper, a matte paper, a glossy paper, etc. The fixing properties, water resistance as well as the odor and flash point of the ink composition can be easily controlled by selecting the number of the ester and ether groups and the number of carbon atoms in the alkyl group.

In view of the safeness and odor of the ink composition, the (poly)alkylene glycol derivative preferably has a flash point of 70 to 120° C., more preferably 80 to 100° C., and preferably a boiling point of 170 to 250° C.

When the (poly)alkylene glycol derivative is used in combination with the nitrogen-containing heterocyclic compound, the flash point of the ink composition as a whole can be easily set to 63° C. or higher so that the ink composition has very high safeness with regard to the ignition during transportation of the ink composition.

Examples of the (poly)alkylene glycol derivative include compounds having one free hydroxyl group such as a monoalkyl ether or a monoalkyl ester of a (poly)alkylene glycol, etc., and compounds having no free hydroxyl group such as a monoalkyl ether monoalkyl ester, a dialkyl ether or a dialkyl ester of a (poly)alkylene glycol, etc.

Among them, the compounds having no hydroxyl group such as the monoalkyl ether monoalkyl ester, the dialkyl ether and the dialkyl ester are preferable since they can decrease the viscosity of the ink composition and improve the water resistance of the ink composition. Among the alkyl esters, those having a methyl ester group are preferable.

Examples of the monoalkyl ether monoalkyl ester of a (poly)aklylene glycol include ethylene glycol monoalkyl ether monoalkyl ester, diethylene glycol monoalkyl ether monoalkyl ester, triethylene glycol monoalkyl ether monoalkyl ester, propylene glycol monoalkyl ether monoalkyl ester, dipropylene glycol monoalkyl ether monoalkyl ester, tripropylene glycol monoalkyl ether monoalkyl ester, and so on.

Among them, di- or trialkylene glycol monoalkyl ether monoalkyl ester is preferable since it has a larger molecular weight, a higher flash point and boiling point, and lower odor than monoalkylene glycol monoalkyl ether monoalkyl ester.

In particular, diethylene glycol monoalkyl ether monoalkyl ester and dipropylene glycol monoalkyl ether monoalkyl ester are preferably used singly or as a mixture of them.

Since these compounds have a moderate molecular weight, they have the safeness and prevent the clogging of nozzles due to the drying of the ink composition at the same time. They have no unpleasant odor and therefore the ink composition comprising such solvents has no unpleasant odor.

Furthermore, the dipropylene glycol derivatives have better safeness and thus more suitable for use in the ink composition than the diethylene glycol derivatives.

Specific examples of such glycol derivatives include diethylene glycol monoethyl ether monomethyl ester, diethylene glycol monobutyl ether monomethyl ester, dipropylene glycol monomethyl ether monomethyl ester, dipropylene glycol monoethyl ether monomethyl ester, etc.

The above derivatives are preferably used since they have a particularly high flash point. In particular, dipropylene glycol monomethyl ether monomethyl ester is preferable as a solvent of the ink composition according to the present invention, since it has a high flash point and low odor.

Examples of the dialkyl ether of a (poly)alkylene glycol include ethylene glycol dialkyl ether, diethylene glycol dialkyl ether, triethyleneglycol dialkyl ether, propylene glycol dialkyl ether, dipropylene glycol dialkyl ether, tripropylene glycol dialkyl ether, etc. They may be used singly or as a mixture of two or more of them.

Specific examples of such dialkyl ethers of a (poly)alkylene glycol include ethylene glycol dibutyl ether, diethylene glycol dimethyl ether, diethylene glycol diethyl ether, diethylene glycol dibutyl ether, propylene glycol dimethyl ether, propylene glycol diethyl ether, propylene glycol dibutyl ether, dipropylene glycol dimethyl ether, dipropylene glycol diethyl ether, etc. These derivatives have particularly low odor.

Among them, (poly)propylene glycol dialkyl ethers are preferably used as the solvents of the ink composition according to the present invention, since they have relatively low odor and a low viscosity.

Examples of the dialkyl ester of (poly)alkylene glycol include ethylene glycol dialkyl ester, diethylene glycol dialkyl ester, triethyleneglycol dialkyl ester, propylene glycol dialkyl ester, dipropylene glycol dialkyl ester, tripropylene glycol dialkyl ester, etc. They may be used singly or as a mixture of two or more of them.

Preferable examples of such dialkyl esters of a (poly)alkylene glycol include ethylene glycol dimethyl ester, diethylene glycol, dimethyl ester, propylene glycol dimethyl ester, dipropylene glycol dimethyl ester, etc., since they have low odor.

Among them, propylene glycol dimethyl ester is preferably used as the solvent of the ink composition according to the present invention, since it has relatively low odor and a low viscosity.

The (poly)alkylene glycol derivatives may be used singly or as a mixture of two or more of them. One or more (poly)alkylene glycol derivatives are contained in the ink composition in an amount of 30 to 90% by weight, preferably 50 to 90% by weight.

To qualitatively and quantitatively analyze the (poly)alkylene glycol derivative in the ink composition, gas chromatographic mass spectroscopy (GCMS) is advantageously used.

Optionally, a (poly)alkylene glycol derivative having a flash point of lower than 63° C. may be used. Such a (poly)alkylene glycol derivative is used in combination with the other (poly)alkylene glycol derivative in an amount such that the ink composition as a whole has a flash point of at least 63° C. For example, when a (poly)alkylene glycol derivative having a flash point of 50 to 63° C., it is used in an amount of 35% by weight or less, preferably 30% by weight or less based on the whole weight of the ink composition.

The ink composition of the present invention contains the (poly)alkylene glycol derivative and the nitrogen-containing heterocyclic compound as the essential organic solvents. Apart from these essential organic solvents, the ink composition of the present invention may optionally contain other general organic solvents such as alcohols, ketones, esters, amines, glycols, glycol ethers, aromatic compounds, etc. The kind and amount of such an optional organic solvent should be selected so that the characteristic properties of the ink composition of the present invention are not impaired.

In particular, most of the ketones, esters and aromatic compounds emit odor even if they are used in a small amount. Therefore, when such a solvent is used, one having a boiling point of at least 150° C. and a flash point of at least 70° C. is preferably used. Since an organic solvent having a boiling point lower than 150° C. emits odor, its amount is preferably less than 1% by weight, more preferably less than 0.5% by weight, most preferably less than 0.1% by weight based on the whole weight of the ink composition.

The oil-based pigmented ink composition of the present invention is characterized in that the composition as a whole has a flash point of at least 63° C., preferably at least 70° C. by the use of the specific combination of the organic solvents. When an ink composition has a flash point of 62° C. or lower, it is classified into flammable liquids having a high flash point in the case of dangerous materials to be shipped according to international transport-related laws. Therefore, the handling of such ink compositions is difficult because of the limitation of the transport or transfer. Furthermore, such ink composition may carry a lot of risk such as firing in the case of troubles, for example, the leakage of the ink composition. In contrast, when the ink composition has a flash point of 63° C. or higher, such problems can be avoided. When the ink composition has a flash point of 70° C. or higher, it is designated as Hazardous Material Group IV, Third Petroleum Oil, which is listed in the Appendix to the Fire Defense Law in Japan. Thus, its handling is easy and the dangers such as firing are suppressed, in view of the restrictions encountered in the production, storage, transport and the like.

The oil-based pigmented ink composition of the present invention contains one or more pigments as coloring agents in view of light stability. The pigments include inorganic pigments and organic pigments. The pigments may be modified to increase the dispersibility thereof. For example, modified pigments having a dialkylaminomethyl group or dialkylaminoethylsulfonic acid amide group are preferably used.

Examples of the inorganic pigment include titanium oxide, Chinese white (zinc flower), zinc oxide, lithopone, iron oxide, aluminum oxide, silicon dioxide, kaolinite, montmorillonite, talc, barium sulfate, calcium carbonate, cadmium red, red oxide, molybdenum red, chrome vermilion, molybdate orange, chrome yellow, cadmium yellow, yellow iron oxide, chromium oxide, viridian, cobalt green, titanium cobalt green, Paris blue, cobalt chrome green, Armenian blue, ultramarine blue pigment, cobalt blue, cerulean blue, manganese violet, cobalt violet, mica, etc. Also, carbon black comprising acidic, neutral or basic carbon may be used.

Examples of the organic pigments include azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, isoindolione pigments, etc. In addition, hollow particles of crosslinked acrylic resins may be used as a pigment.

Examples of pigments contained in cyan ink compositions include C.I. Pigment Blue 1, 2, 3, 15:3, 15:4, 15:34, 16, 22 and 60, etc. In particular, one or more of C.I. Pigment Blue 15:3 and 15:3 are preferably used in view of their good weather resistance and coloring power.

Examples of pigments contained in magenta ink compositions include C.I. Pigment Red 5, 7, 12, 48 (Ca), 48 (Mn), 57 (Ca), 57:1, 112, 122, 123, 168, 184, 202, 209 and 254, C.I. Pigment Violet 19, etc. In particular, one or more of C.I. Pigment Red 122, 202, 209 and 254 and C.I. Pigment Violet 19 are preferably used in view of their good weather resistance and coloring power.

Examples of pigments contained in yellow ink compositions include C.I. Pigment Yellow 1, 2, 3, 12, 13, 14C, 16, 17, 73, 74, 75, 83, 93, 95, 97, 98, 109, 110, 114, 120, 128, 129, 130, 138, 139, 147, 150, 151, 154, 155, 180, 185, 213, 214, etc. Among them, C.I. Pigment Yellow 74, 83, 109, 110, 120, 128, 138, 139, 150, 151, 154, 155, 213 and 214 are preferably used singly or as a mixture thereof in view of their good weather resistance.

Examples of pigments contained in black ink compositions include HCF, MCF, RCF, LEF and SCF (available from Mitsubishi Chemical Co., Ltd.), MONARCH and REGAL (available from Cabot, USA), COLOR BLACK, SPECIAL BLACK and PRINTEX (available from Degussa Huls AG), TOKA BLACK (available from TOKAI CARBON Co., Ltd.), RAVEN (available from Columbian Chemical, USA), and the like.

In particular, one or more of HCF #2650, #2600, #2350 and #2300, MCF #1000, #980, #970 and #960, MCF 88, LFFMA 7, MA 8, MA 11, MA 77 and MA 100 (available from Mitsubishi Chemical Co., Ltd.), and PRINTEX 95, 85, 75, 55 and 45 (available from Degussa Huls AG) are preferably used.

In the oil-based pigmented ink composition of the present invention, polymer are used as a pigment-dispersant and/or a fixing resin. The pigment-dispersant has good affinity with the pigment and stabilizes the dispersion of the pigment. The fixing resin has good adhesion to a substrate and imparts durability to the printed material.

When the pigment-dispersant and/or the fixing resin are adequately selected depending on the kinds of the pigment, organic solvents and printing medium, the ink composition has good effects. Among the polymers, a single polymer may act as a pigment-dispersant and a fixing resin.

The polymer preferably has a solubility in water and ethanol of 3% by weight or less, more preferably 1% by weight or less.

The pigment-dispersant and the fixing resin remain on the surface of the substrate after printing with the ink-jet printing system and then they are dried and fixed to the substrate. Therefore, if the polymer is easily soluble in water, the printed material has less water resistance so that the printed characters and/or images are washed off with rain, when the printed material is used outdoors. When the printed material is used in the form of a poster, a coating agent is often sprayed on the printed surface. Since the coating agent usually contains an alcoholic solvent as a primary solvent, the printed characters and images are sagged with the coating agent if the polymers are easily soluble in the alcoholic solvent.

In contrast, the polymers having the solubility in water and ethanol in the above range do not suffer from such problems.

As the pigment-dispersant, an ionic or nonionic surfactant, or an anionic, cationic or nonionic polymer is used. In view of the dispersion stability, water resistance and the durability of the printed material such as scratch resistance, etc, the polymer, in particular, a polymer having a cationic group or an anionic group is preferable.

The pigment-dispersant stabilizes the pigment in the organic solvent through an acid-base interaction between the pigment and the dispersant. Thus, the pigment-dispersant should contain at least one of a cationic group and an anionic group, which function as pigment-absorbing sites, and the kind and amount of the cationic group and the anionic group of the dispersant are selected depending on the kind of the pigment.

Examples of the polymeric pigment-dispersant include SOLSPERSE (available from Zeneca), DISPER BYK (available from BYK-Chemie), EFKA (available from EFKA Additives), etc. Among them, DISPER BYK 161, 162 and 168, and EFKA 4050, 4055 and 4060 are preferable. When these pigment-dispersants are selected and used according to the kinds of the pigment and solvents, the ink composition can often exhibit good effects.

The pigment-dispersants are usually available in the market in the form of solutions. In such a case, the solution contains a low-boiling solvent such as toluene, xylene, ethyl acetate, butyl acetate, methyl ethyl ketone, etc. When the solution is used as such in the preparation of the ink composition, the ink composition may have odor originated from such a solvent. Therefore, the low-boiling solvent is removed from the solution of the pigment-dispersant, if necessary, when the solvents may have adverse affects on the properties of the ink composition, for example, odor, safeness, etc. The low-boiling solvent can be removed by vacuum distillation, reprecipitation, etc.

By such removal methods, the content of the low-boiling solvent in the dispersant solution, in particular, a solvent having a boiling point of 170° C. or lower, is decreased to 1% by weight or lower, preferably 0.5% by weight or lower, more preferably 0.1% by weight or lower of the dispersant solution. Thereby, the odor of the ink composition can be controlled.

Examples of the fixing resin include acrylic resins, polyester resins, polyurethane resins, vinyl chloride resins, cellulose resins (e.g. nitrocellulose), and the like. Most of these resins have good fixing properties to PVC. The water resistance, dispersion stability, printing properties, etc. can be controlled by selecting the functional groups and structures of the resins.

Examples of the acrylic resin include JOHNCRYL of Johnson Polymer and S-LEK of Sekisui Chemical Co., Ltd. Examples of the polyester resin include ELITEL of UNITIKA Co., Ltd. and VYLON of Toyobo Co., Ltd. Examples of the polyurethane resin include VYLON UR of Toyobo Co., Ltd., NT-HiLamic of Dainichi Seika Color & Chemicals Mfg. Co., Ltd., CRISVON of Dainippon Ink and Chemicals Incorporated, and NIPPORAN of Nippon Polyurethane Industry Co., Ltd. Examples of the vinyl chloride resin include SOLBIN of Nissin Chemical Industries, Ltd., SEKISUI PVC-TG and SEKISUI PVC-HA of Sekisui Chemical Co., Ltd., and UCAR Series of DOW CHEMICAL. Examples of nitrocellulose include HIG, LIG, SL and VX of ASAHI CHEMICAL Co., Ltd. and NITROCELLULOSE RS and SS of DAICEL CHEMICAL INDUSTRIES, LTD.

Among them, the polyurethane resins, polyester resins, vinyl chloride resins and nitrocellulose are preferable.

The fixing resin preferably has a weight average molecular weight of 2000 to 100,000, more preferably 5000 to 80,000, most preferably 10,000 to 50,000.

When the weight average molecular weight of the fixing resin is less than 2000, the effect of steric repellence may not be achieved when the anionic resin is adsorbed on the pigment particles in the ink composition so that the storage stability of the ink composition is not improved, the fixing of the pigment to the printing medium may not be increased, and thus the film strength may not be sufficiently attained. When the weight average molecular weight of the fixing resin exceeds 100,000, the effects of the use of the fixing resin is saturated and also the viscosity of the ink composition increases so that the ink composition may not have sufficient flowability.

Herein, the weight average molecular weight means a molecular weight of the resin measured by gel permeation chromatography and calibrated with standard samples of polystyrene.

When the polymeric a pigment-dispersant is present in the ink composition of the present invention, the amount of the pigment-dispersant may depend on the kinds of the pigment and solvent used for dispersing the pigment, the dispersing conditions, etc., and is usually from 5 to 150% by weight, in particular, from 40 to 150% by weight when the organic pigment is used, and from 5 to 60% by weight when the inorganic pigment is used, based on the weight of the pigment.

When the polymeric fixing resin is present in the ink composition of the present invention, the amount of the fixing resin may depend on the kind and molecular weight of the resin, the kinds of the pigment and solvents, and is usually from 5 to 200% by weight based on the weight of the pigment.

The ink composition of the present invention can be prepared by any conventional method. For example, the pigment, the polymer (pigment-dispersant) and the (poly) alkylene glycol derivative as a part of the solvents are premixed and dispersed. Then, to the dispersion, the polymer (fixing resin), the rest of the (poly)alkylene glycol derivative and the nitrogen-containing heterocyclic compound are added and mixed to disperse the pigment and the polymers in the solvents.

To prepare the above dispersion, the components are well stirred and mixed using a barrel-driving type mills (e.g. ball mill, centrifugal mill, planetary mill, etc.), high-speed rotation mills (e.g. sand mill, etc.), medium-agitation mills (e.g. agitated vessel mill, etc.), simple dispersing equipment (e.g. disper, etc.), and the like.

After the formation of the dispersion, the dispersion may additionally be uniformly mixed with a simple stirrer such as a three-one motor, a magnetic stirrer, a disper, a homogenizer, etc. Furthermore, to reduce the particle size of the solid components, the dispersion may optionally be mixed with a dispersing equipment such as a bead mill, a high pressure jet mill, etc.

Besides the pigment, polymers and organic solvents, the ink composition of the present invention may optionally contain conventionally used additives such as surfactants, surface-modifiers, leveling agents, defoaming agents, antioxidants, pH regulators, charging agents, disinfectants, preservatives, deodorants, charge-adjusters, wetting agents, anti-skinning agents, UV-ray absorbers, perfumes, pigment derivatives, etc.

The oil-based pigmented ink of the present invention, in particular, one for ink-jet printing systems, has a surface tension of 20 to 40 mN/m (at 25° C.) and a viscosity of 2 to 15 cp (at 25° C.), preferably 3 to 13 cp, more preferably 4 to 12 cp.

When the ink composition having the surface tension and viscosity in the above ranges is used in the ink-jet printing system, it has good jetting properties so that the flying track of an ink drop is not curved or swerved, and the printed characters or images are not or hardly blurred, when the ink composition is printed on a plain paper or a matte paper, etc.

In the oil-based pigmented ink composition of the present invention, the pigment preferably has a dispersion average particle size of 20 to 200 nm, more preferably 50 to 160 nm. When the dispersion average particle size is less than 20 nm, the particles are too small so that the printed material may lose the durability. When the dispersion average particle size exceeds 200 nm, the fineness of the printed material may deteriorate.

With the oil-based pigmented ink composition of the present invention, the surface tension and viscosity at 25° C. and the dispersion average particle size and maximum dispersion particle size of the pigment can be adjusted in the above respective ranges by suitably selecting the kinds and amounts of the components of the ink composition, since the above specific compounds are used as the organic solvents.

The oil-based pigmented ink composition of the present invention has low odor and high safeness, is printable on various printing media such as an inexpensive film of PVC having no receptive layer and can endure the outdoor use conditions. Furthermore, the oil-based pigmented ink composition of the present invention is advantageously used in the ink-jet printing systems. In such systems, the four or more ink compositions including the cyan, magenta, yellow and black ink compositions can be used at the same time to form images.

EXAMPLES

Hereinafter, the present invention will be illustrated by the following examples, in which "parts" means "parts by weight" unless otherwise indicated.

In the Examples, a pigment-dispersant "BYK 161" and a fixing resin "Vylon UR-8300" were used after removing low boiling solvents by vacuum distillation and then diluting them with organic solvents to be used in a dispersing step to a solid content of 20% by weight.

In the Examples, the amounts of pigment-dispersants "BYK 161" and "SOLSPERSE 13940" and a fixing resin "Vylon UR 8300" are expressed in terms of weights after being diluted with organic solvents.

Example 1

In a 100 cc plastic bottle, 4 parts of a copper phthalocyanine blue pigment ("FASTOGEN BLUE 5430SD" available from Dainippon Ink and Chemicals Incorporated), 10 parts of a pigment-dispersant ("BYK 161", an amine-based polymeric dispersant, available from BYK-Chemie), 6 parts of dipropylene glycol monomethyl ether monomethyl ester (available from Dow Chemical; flash point: 96° C.) as an organic solvent and 100 parts of zirconia beads having a diameter of 0.3 mm were weighed and charged. Then, the mixture was dispersed with a paint conditioner (available from TOYO SEIKI KOGYO Co., Ltd.) for 2 hours.

Then, 7.5 parts of the dispersion prepared in the previous step, 3.8 parts of a polyurethane resin ("Vylon UR 8300" available from TOYOBO Co., Ltd.), 10 parts of N-methyl-2-pyrrolidone, 18.7 parts of dipropylene glycol monomethyl ether monomethyl ester and 10 parts of dipropylene glycol dimethyl ether (available from Dow Chemical; flash point: 60° C.) were added, and the mixture was stirred with a magnetic stirrer for 30 minutes. Thereafter, the mixture was suction filtrated through a glass filter (available from KIRIYAMA GLASS WORKS Co., Ltd.) to obtain an oil-based pigmented ink composition (hereinafter referred to as Ink Composition A).

Example 2

A dispersion was prepared in the same manner as in Example 1 except that a quinacridon pigment ("HOSTAPERM PINK EB trans" available from Clariant AG) was used in place of the copper phthalocyanine pigment, and 20 parts of the pigment-dispersant "BYK 161" and 6 parts of dipropylene glycol monomethyl ether monomethyl ester were used. Then, using this dispersion, an oil-based pigmented ink composition (Ink Composition B) was prepared in the same manner as in Example 1.

Example 3

A dispersion was prepared in the same manner as in Example 1 except that an azo pigment ("NOVOPERM Yellow H2G" available from Clariant AG) was used in place of the copper phthalocyanine pigment. Then, using this dispersion, an oil-based pigmented ink composition (Ink Composition C) was prepared in the same manner as in Example 1.

Example 4

A dispersion was prepared in the same manner as in Example 1 except that an acidic carbon black pigment ("MA 8" available from MITSUBISHI CHEMICAL CORPORATION) was used in place of the copper phthalocyanine pigment. Then, using this dispersion, an oil-based pigmented ink composition (Ink Composition D) was prepared in the same manner as in Example 1.

Example 5

A dispersion was prepared in the same manner as in Example 2 except that a quinacridon pigment ("Chromofine Magenta 6887" available from Dainichi Seika Color & Chemicals Mfg. Co., Ltd.) was used in place of the quinacridone pigment "HOSTAPERM PINK EB trans".

Then, to 7.5 parts of the dispersion prepared in the previous step, 0.6 part of nitrocellulose ("RS 1/4" available from DAICEL CHEMICAL INDUSTRIES, LTD.), 10 parts of N-methyl-2-pyrrolidone, 21.9 parts of dipropylene glycol monomethyl ether monomethyl ester and 10 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition E).

Example 6

A dispersion was prepared in the same manner as in Example 1 except that an azo pigment ("YELLOW PIGMENT E4GN-GT" available from Bayer AG) was used in place of the copper phthalocyanine pigment, and 20 parts of the pigment-dispersant "BYK 161" and 6 parts of dipropylene glycol monomethyl ether monomethyl ester were used.

Then, to 7.5 parts of the dispersion prepared in the previous step, 0.8 part of a polyester resin ("ELITEL UE-9800" available from UNITIKA Co., Ltd.; weight average molecular weight: 13,000), 10 parts of N-methyl-2-pyrrolidone, 21.7 parts of dipropylene glycol monomethyl ether monomethyl ester, and 10 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition F).

Example 7

A dispersion was prepared in the same manner as in Example 1 except that a basic carbon black pigment ("Printex 85" available from DEGUSSA HULS) was used in place of the copper phthalocyanine pigment, and propylene glycol dimethyl ether (available from Dow Chemical; flash point: 93° C.) was used in place of dipropylene glycol monomethyl ether monomethyl ester.

Then, to 7.5 parts of the dispersion prepared in the previous step, 0.5 part of a polyester resin ("Vylon 296" available from TOYOBO Co., Ltd.; weight average molecular weight: 14,000), 10 parts of N-methyl-2-pyrrolidone, and 32 parts of diethyleneglycol dibutyl ether (available from KYOWA HAKKO KOGYO Co., Ltd.; flash point: 122° C.) were added, and the mixture was stirred with a magnetic stirrer for 30 minutes. Thereafter, the mixture was suction filtrated through a glass filter to obtain an oil-based pigmented ink composition (Ink Composition G).

Example 8

A dispersion was prepared in the same manner as in Example 1 except that an amine-based polymer dispersant "BYK 168" (available from BYK-Chemie) was used in place of "BYK 161".

Then, to 7.5 parts of the dispersion prepared in the previous step, 1.1 parts of a vinyl chloride-vinyl acetate copolymer ("VROH" available from Dow Chemical; weight average molecular weight: 15,000), 10 parts of N-methyl-2-pyrrolidone, 19.4 parts of dipropylene glycol monomethyl ether monomethyl ester and 12 parts of dipropylene glycol dimethyl ether (available from Dow Chemical; flash point: 60° C.) were added, and the mixture was stirred with a magnetic stirrer for 60 minutes. Thereafter, the mixture was suction filtrated through a glass filter to obtain an oil-based pigmented ink composition (Ink Composition H).

Example 9

A dispersion was prepared in the same manner as in Example 1 except that ethylene glycol monobutyl ether monoethyl ester (available from KYOWA HAKKO KOGYO Co., Ltd.; flash point: 87.5° C.; boiling point: 192° C.) was used in place of dipropylene glycol monomethyl ether monomethyl ester.

Then, to 7.5 parts of the dispersion prepared in the previous step, 3.8 parts of a polyurethane resin ("Vylon UR 8300" available from TOYOBO Co., Ltd.), 10 parts of N-methyl-2-pyrrolidone, 23.7 parts of ethylene glycol monobutyl ether monomethyl ether, and 5 parts of dipropylene glycol monomethyl ether monomethyl ester were added, and the mixture was stirred with a magnetic stirrer for 30 minutes. Thereafter, the mixture was suction filtrated through a glass filter to obtain an oil-based pigmented ink composition (Ink Composition I).

Example 10

A dispersion was prepared in the same manner as in Example 1 except that an azo pigment ("YELLOW PIGMENT E4GN-GT" available from Bayer AG) was used in place of the copper phthalocyanine pigment, and 10 parts of a pigment-dispersant "BYK 168" was used in place of "BYK 161".

Then, to 7.5 parts of the dispersion prepared in the previous step, 0.8 part of a vinyl chloride-vinyl acetate copolymer ("SOLBIN TA5R" available from NISSIN CHEMICAL Co., Ltd.; weight average molecular weight: 28,000), 10 parts of N-ethyl-2-pyrrolidone, 19.7 parts of dipropylene glycol monomethyl ether monomethyl ester, and 12 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition J).

Example 11

To 7.5 parts of the dispersion prepared in the same manner as in Example 1, 3.8 parts of "Vylon UR 83001", 5 parts of N-methyl-2-pyrrolidone, 23.7 parts of dipropylene glycol monomethyl ether monomethyl ester, and 10 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition K).

Example 12

To 7.5 parts of the dispersion prepared in the same manner as in Example 1, 3.8 parts of "Vylon UR 8300", 15 parts of N-methyl-2-pyrrolidone, 13.7 parts of dipropylene glycol monomethyl ether monomethyl ester, and 10 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition L).

Comparative Example 1

Oil-based pigmented ink composition comprising 50% by weight or more of (poly)alkylene glycol derivative having a flash point lower than 50° C.

A dispersion was prepared in the same manner as in Example 1 except that propylene glycol monomethyl ether monoethyl ether having a flash point of 46.5° C. (available from KYOWA HAKKO KOGYO Co., Ltd.) was used in place of dipropylene glycol monomethyl ether monomethyl ester.

Then, to 7.5 parts of the dispersion prepared in the previous step, 3.8 parts of "Vylon UR 8300", 10 parts of N-methyl-2-pyrrolidone, 18.7 parts of propylene glycol monomethyl ether monomethyl ester, and 10 parts of dipropylene glycol monomethyl ether monomethyl ester were added, and the mixture was stirred with a magnetic stirrer for 30 minutes. Thereafter, the mixture was suction filtrated through a glass filter to obtain an oil-based pigmented ink composition (Ink Composition M).

Comparative Example 2

Oil-based pigmented ink composition comprising a hydrocarbon as a primary solvent A dispersion was prepared in the same manner as in Example 1 except that an aliphatic hydrocarbon solvent ("ISOPER G" available from Exxon Chemical) was used in place of dipropylene glycol monomethyl ether monomethyl ester, and an amine-based polymer dispersant ("SOLSPERSE 13940" available from Zeneca) was used as a pigment-dispersant.

Then, the ink composition was prepared in the same manner as in Example 1 except that 10 parts of N-dimethyl-2-pyrrolidone and 28 parts of "ISOPER G" were added to 10 parts of the dispersion prepared in the previous step.

Comparative Example 3

Oil-based pigmented ink composition 1 containing no N-alkyl-2-pyrrolidone

To 7.5 parts of the dispersion prepared in the same manner as in Example 1, 0.8 part of nitrocellulose ("RS 1/4" available from DAICEL CHEMICAL INDUSTRIES, LTD.), 31.7 parts of dipropylene glycol monomethyl ether monomethyl ester, and 10 parts of dipropylene glycol dimethyl ether were added, and the mixture was stirred with a magnetic stirrer for 30 minutes. Thereafter, the mixture was suction filtrated through a glass filter to obtain an oil-based pigmented ink composition (Ink Composition 0).

Example 4

Oil-based pigmented ink composition 2 containing no N-alkyl-2-pyrrolidone

A dispersion was prepared in the same manner as in Example 1 except that ethylene glycol monobutyl ether monomethyl ester was used in place of dipropylene glycol monomethyl ether monomethyl ester.

Then, to 7.5 parts of the dispersion prepared in the previous step, 1 part of a polyester resin ("Vylon 200" available from TOYOBO Co., Ltd.), and 41.5 parts of ethylene glycol monobutyl ether monomethyl ester were added, and the mixture was stirred with a magnetic stirrer for 60 minutes. Thereafter, the mixture was suction filtrated through a glass filter to obtain an oil-based pigmented ink composition (Ink Composition P).

Comparative Example 5

Oil-based pigmented ink composition 3 containing no N-alkyl-2-pyrrolidone

A dispersion was prepared in the same manner as in Example 1 except that an acidic carbon black ("MA 100" available from Mitsubishi Chemical Co., Ltd.) was used in place of the copper phthalocyanine pigment, diethylene glycol monobutyl ether monomethyl ester (flash point: 124° C.; boiling point: 247° C.) was used in place of dipropylene glycol monomethyl ether monomethyl ester, and 2.0 parts of an anionic surfactant ("HOMOGENOL L-95" available from KAO Corporation) was used as a pigment-dispersant.

Then, to 16.25 parts of the dispersion prepared in the previous step, chlorinated polyethylene ("HE-510" available from Nippon Paper Industries Co., Ltd.), and 29.5 parts of diethylene glycol monobutyl ether monomethyl ester as an organic solvent were added. Thereafter, an ink composition (Ink Composition Q) was prepared in the same manner as in Example 1.

Comparative Example 6

Oil-based pigmented ink composition 1 containing no (poly)alkylene glycol derivative A dispersion was prepared in the same manner as in Example 1 except that a quinacridon pigment ("PV Fast Red E5B" available from Clariant AG) was used in place of the copper phthalocyanine pigment, propylene carbonate (flash point: 132° C.; boiling point: 242° C.) was used in place of dipropylene glycol monomethyl ether monomethyl ester, and 2.0 parts of "HOMOGENOL L-95" was used as a pigment-dispersant.

Then, to 16.25 parts of the dispersion prepared in the previous step, 4.25 parts of nitrocellulose ("SL-1" available from Asahi Chemical Co., Ltd.), and 29.5 parts of propylene carbonate as an organic solvent were added. Thereafter, an ink composition (Ink Composition R) was prepared in the same manner as in Example 1.

Comparative Example 7

Oil-based pigmented ink composition 2 containing no (poly)alkylene glycol derivative A dispersion was prepared in the same manner as in Comparative Example 6 except that cyclohexanone (flash point: 44° C.; boiling point: 156° C.) was used in place of propylene carbonate.

Then, to 16.25 parts of the dispersion prepared in the previous step, 8.5 parts of "Vylon 200", and 29.5 parts of cyclohexanone as an organic solvent were added. Thereafter, an ink composition (Ink Composition S) was prepared in the same manner as in Example 1.

Comparative Example 8

Aqueous pigmented ink composition containing water and N-methyl-2-pyrrolidone as solvents In a 100 cc plastic bottle, 4 parts of a copper phthalocyanine blue pigment ("FASTOGEN BLUE 5430SD" available from Dainippon Ink and Chemicals Incorporated), 6 parts of a pigment-dispersant ("JOHNCRYL" available from JOHNSON POLYMER CORPORATION), 10 parts of a mixture of ion-exchanged water and triethylene glycol (90:10 by weight), and 100 parts of zirconia beads having a diameter of 3 mm were weighed and charged. Then, the mixture was dispersed with a paint conditioner (available from TOYO SEIKI KOGYO Co., Ltd.) for 2 hours.

Then, to 7.5 parts of the dispersion prepared in the previous step, 10 parts of N-methyl-2-pyrrolidone, and 22.5 parts of ion-exchanged water were added, and the mixture was stirred with a magnetic stirrer for 30 minutes. Thereafter, the mixture was suction filtrated through a glass filter to obtain an aqueous pigmented ink composition (Ink Composition T).

With Ink Compositions A to L of Examples 1–12, Ink Compositions M to S of Comparative Examples 1–7, and Ink Composition T of Comparative Example 8, a viscosity, a surface tension, a dispersion average particle size and a flash point were measured by the methods described below. The results are shown in Table 1.

Viscosity:

A viscosity of an ink composition was measured using a R100 viscometer (available from TOKI SANGYO Co., Ltd.) at 25° C. and a cone rotation speed of 20 rpm.

Surface Tension:

A surface tension of an ink composition was measured using a full-automatic balance type electrotensiometer ESB-V (available from KYOWA SCIENCE Co., Ltd.) at an ink temperature of 25° C.

Dispersion Average Particle Size:

A dispersion average particle size of pigment particles was measured using a particle size analyzer N4-PLUS (a laser Doppler particle size analyzer available from Coulter).

Flash Point:

A flash point was measured using a SETA sealed flash point tester.

TABLE 1

| Example No. | Ink composition | Viscosity (cp) | Surface tension (mN/m) | Dispersion average particle size (nm) | Flash point (° C.) |
|---|---|---|---|---|---|
| Ex. 1 | A | 4.5 | 29.0 | 98 | 74 |
| Ex. 2 | B | 5.0 | 28.8 | 128 | 75 |
| Ex. 3 | C | 4.3 | 29.1 | 135 | 74 |
| Ex. 4 | D | 4.2 | 28.8 | 105 | 75 |
| Ex. 5 | E | 5.2 | 28.8 | 110 | 74 |
| Ex. 6 | F | 4.9 | 29.3 | 158 | 75 |
| Ex. 7 | G | 5.6 | 29.5 | 139 | 102 |
| Ex. 8 | H | 4.7 | 28.8 | 118 | 71 |
| Ex. 9 | I | 4.2 | 28.2 | 104 | 72 |
| Ex. 10 | J | 5.2 | 28.9 | 148 | 71 |
| Ex. 11 | K | 4.4 | 28.7 | 99 | 73 |
| Ex. 12 | L | 4.7 | 29.3 | 101 | 75 |
| C. Ex. 1 | M | 3.8 | 26.9 | 104 | 55 |
| C. Ex. 2 | N | 4.0 | 23.2 | 135 | 43 |
| C. Ex. 3 | O | 4.1 | 28.4 | 116 | 75 |
| C. Ex. 4 | P | 3.2 | 29.5 | 115 | 48 |
| C. Ex. 5 | Q | 11.8 | 29.0 | 187 | 124 |
| C. Ex. 6 | R | 11.5 | 35.0 | 195 | 132 |
| C. Ex. 7 | S | 3.5 | 36.5 | 138 | 43 |
| C. Ex. 8 | T | 3.1 | 36.5 | 128 | — |

As can be seen from the results in Table 1, the oil-based pigmented ink compositions A to L according to the present invention has adequate viscosities, surface tensions and dispersion average particle sizes, and also they have a flash point of 70° C. or higher, so that they are designated as Hazardous Material Group IV, Third Petroleum Oil, water-insoluble liquid, which is listed in the Appendix to the Fire Defense Law in Japan, and can be relatively safely handled.

In contrast, oil-based pigmented ink compositions M, N, P and S of Comparative Examples 1, 2, 4 and 7 had a flash point lower than 70° C., so that they are designated as Hazardous Material Group IV, Second Petroleum Oil, water-insoluble liquid. Thus, such compositions should be carefully handled and their storage and transportation are restricted.

Next, with Ink Compositions A to L of Examples 1–12, Ink Compositions M to S of Comparative Examples 1–7, and Ink Composition T of Comparative Example 8, a drying property, a fixing property, alcohol resistance and odor were evaluated by the methods described below. The results are shown in Table 2.

Drying Property:

An ink composition was coated on a glossy PVC sheet (P-224RW available from LINTEC Corporation) with a No. 6 wire bar (available from TOYO SEIKI KOGYO Co., Ltd.) in a temperature-controlled room at 25° C. and 30% RH, and its drying property was evaluated according to the following criteria:

A: When the coated composition is touched with a finger, the coated composition does not adhere to the finger within one minute drying.

B: When the coated composition is touched with a finger, the coated composition does not adhere to the finger within 5 minutes drying.

C: When the coated composition is touched with a finger, the coated composition still adheres to the finger after 5 minutes drying.

Fixing Property:

An ink composition was coated on a glossy PVC sheet (P-224RW available from LINTEC Corporation) with a No. 6 wire bar (available from TOYO SEIKI KOGYO Co., Ltd.) in a temperature-controlled room at 25° C. and 30% RH, and kept standing for 1 hour. After that, the surface of the coated ink composition was scrubbed with a finger for 30 seconds. Then, the fixing property was evaluated according to the following criteria:

A: No scrubbed mark was observed.
B: A small number of scrubbed marks were observed.
C: Scrubbed marks were generated and the substrate PVC sheet was exposed.

Alcohol Resistance:

An ink composition was coated on a glossy PVC sheet (P-224RW available from LINTEC Corporation) with a No. 6 wire bar (available from TOYO SEIKI KOGYO Co., Ltd.) in a temperature-controlled room at 25° C. and 30% RH, and kept standing for 1 hour. After that, the surface of the coated ink composition was wiped with a piece of cloth (BEN-COTTON available from ASAHI CHEMICAL Co., Ltd.) soaked with a water/ethanol mixture (weight ratio of 1:1). Then, the alcohol resistance was evaluated according to the following criteria:

A: The surface of the coated ink composition was not wiped off.
B: When the surface of the coated ink composition was strongly wiped, the color was slightly faded.
C: The coated ink composition was easily wiped off and the substrate PVS sheet was exposed.

Odor:

An ink composition was coated on a glossy PVC sheet (P-224RW available from LINTEC Corporation) with a No. 6 wire bar (available from TOYO SEIKI KOGYO Co., Ltd.) in a temperature-controlled room at 25° C. and 30% RH, and kept standing for 10 minutes. Then, the odor from the coated ink composition was smelled and evaluated according to the following criteria:

A: Substantially no odor was smelled.
B: Slight odor was smelled.
C. Unpleasant odor was smelled.

TABLE 2

| Example No. | Ink composition | Drying property | Fixing property | Alcohol resistance | Odor |
| --- | --- | --- | --- | --- | --- |
| Ex. 1 | A | A | A | A | A |
| Ex. 2 | B | A | A | A | A |
| Ex. 3 | C | A | A | A | A |
| Ex. 4 | D | A | A | A | A |
| Ex. 5 | E | A | A | A | A |
| Ex. 6 | F | A | A | A | A |
| Ex. 7 | G | A | A | A | A |
| Ex. 8 | H | A | A | A | A |
| Ex. 9 | I | A | A | A | B |
| Ex. 10 | J | A | A | A | A |
| Ex. 11 | K | B | A | B | A |
| Ex. 12 | L | B | A | A | A |
| C. Ex. 1 | M | A | A | A | C |
| C. Ex. 2 | N | C | C | C | B |
| C. Ex. 3 | O | B | B | B | A |
| C. Ex. 4 | P | B | A | C | B |
| C. Ex. 5 | Q | C | C | C | A |
| C. Ex. 6 | R | C | C | C | A |
| C. Ex. 7 | S | A | A | A | C |
| C. Ex. 8 | T | C | C | C | A |

As can be seen from the results of Table 2, oil-based pigmented ink compositions A to L of Examples 1 to 12 had good drying property, fixing property and alcohol resistance, and had problem-free printing property on PVC.

Among oil-based pigmented ink compositions A to L of Examples 1 to 12, ink composition I of Example 9 emitted slight odor and may have a small trouble when used in a printer. However, ink compositions A to H and J to L of Examples 1–8 and 10 to 12 emit substantially no odor and cause no problem when used in a printer.

Since ink composition K of Example 11 contained a small amount of N-methyl-2-pyrrolidone, it slowly interfused in PVC, had a slightly low drying property and did not largely dissolve PVC. Accordingly, its alcohol resistance was not good. Ink composition L of Example 12 containing a relatively large amount of N-methyl-2-pyrrolidone has good fixing property to PVC, but N-methyl-2-pyrrolidone, which should interfuse in PVC, was saturated and remained on the surface, so that its drying property was less satisfactory.

In contrast, ink composition M and S of Examples 1 and 7 had no problem in printing property on PVC. However, since they contained the low-boiling solvent, they had a small problem of odor so that it may cause some trouble when used in a printer. These ink compositions had a flash point of lower than 62° C. as described above. Thus, their storage and transportation are restricted.

Ink composition N and T of Comparative Examples 2 and 8 comprising the hydrocarbon solvent did not emit odor, but had no fixing property on PVC and the ink compositions were repelled.

Furthermore, ink compositions 0 and P of Comparative Examples 3 and 4, which contained no N-alkyl-2-pyrrolidone, had relatively low drying property since they contained no solvent that dissolves the PVC substrate, and they had inferior fixing property and alcohol resistance to the ink compositions of Examples 1 to 12.

Ink composition Q of Comparative Example 5 containing no N-alkyl-2-pyrrolidone and ink composition R of Comparative Example 6 containing neither N-alkyl-2-pyrrolidone nor (poly)alkylene glycol derivative contained the high-boiling solvent so that they had no problem in their odor. However, they had low drying property and did not interfuse in the PVC substrate. Thus, the solvents remained on the surface of the PVC substrate, and the ink composition had poor fixing property and alcohol resistance.

What is claimed is:

1. An oil-based pigmented ink composition comprising a pigment, a polymer and an organic solvent, wherein the organic solvent contains a (poly)alkylene glycol derivative in an amount of 30 to 90% by weight and N-ethyl-2-pyrrolidone in an amount of 1 to 30% by weight, each based on the whole weight of the ink composition, and the ink composition has a flash point of at least 63° C.

2. The oil-based pigmented ink composition according to claim 1, wherein said (poly)alkylene glycol derivative has a flash point of 70 to 120° C., and a boiling point of 170 to 250° C.

3. The oil-based pigmented ink composition according to claim 1, wherein said (poly)alkylene glycol derivative is at least one compound selected from the group consisting of monoalkyl ether monoalkyl esters, dialkyl ethers and dialkyl esters of (poly)alkylene glycols.

4. The oil-based pigmented ink composition according to claim 3, wherein said (poly)alkylene glycol derivative is at least one compound selected from the group consisting of ethylene glycol monoalkyl ether monoalkyl ester, diethylene glycol monoalkyl ether monoalkyl ester, triethylene glycol monoalkyl ether monoalkyl ester, propylene glycol monoalkyl ether monoalkyl ester, dipropylene glycol monoalkyl ether monoalkyl ester, tripropylene glycol monoalkyl ether monoalkyl ester, ethylene glycol dialkyl ether, diethylene glycol dialkyl ether, propylene glycol dialkyl ether, dipropylene glycol dialkyl ether, ethylene glycol dialkyl ester and propylene glycol dialkyl ester.

5. The oil-based pigmented ink composition according to claim 1, wherein said polymer has a solubility in water and ethanol of 3% by weight or less.

6. The oil-based pigmented ink composition according to claim 1, wherein said polymer is at least one of a pigment-dispersant and a fixing resin.

7. The oil-based pigmented ink composition according to claim 6, wherein said pigment-dispersant is contained in an amount of 5 to 150% by weight based on the weight of the pigment.

8. The oil-based pigmented ink composition according to claim 6, wherein said fixing resin is at least one resin selected from the group consisting of acrylic resins, polyester resins, polyurethane resins, vinyl chloride resins and cellulose resins.

9. The oil-based pigmented ink composition according to claim 6, wherein said fixing resin has a weight average molecular weight of 2,000 to 100,000.

10. The oil-based pigmented ink composition according to claim 6, wherein said fixing resin is contained in an amount of 5 to 200% by weight based on the weight of the pigment.

11. The oil-based pigmented ink composition according to claim 1, which has a viscosity of 2 to 15 cp at 25° C., a surface tension of 20 to 40 mN/m at 25° C., and a dispersion average particle size of 20 to 200 nm.

12. The oil-based pigmented ink composition according to claim 1, which is used in an ink-jet printing system.

* * * * *